United States Patent
Li et al.

(10) Patent No.: US 10,268,672 B2
(45) Date of Patent: Apr. 23, 2019

(54) PARALLEL PARSING OF MARKUP LANGUAGE DATA

(71) Applicant: International Business Machines Corporation, Armonk, NY (US)

(72) Inventors: Zhen Li, Beijing (CN); Mi Wan Shum, San Jose, CA (US); DongJie Wei, Beijing (CN); Samuel H. Wong, San Jose, CA (US); Xian Rong Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 15/051,698

(22) Filed: Feb. 24, 2016

(65) Prior Publication Data

US 2016/0292147 A1 Oct. 6, 2016

Related U.S. Application Data

(63) Continuation of application No. 14/672,319, filed on Mar. 30, 2015.

(51) Int. Cl.
*G06F 17/27* (2006.01)
*G06F 17/22* (2006.01)
*G06F 17/30* (2006.01)

(52) U.S. Cl.
CPC ........ *G06F 17/272* (2013.01); *G06F 17/2247* (2013.01); *G06F 17/30663* (2013.01)

(58) Field of Classification Search
CPC ............. G06F 17/272; G06F 17/30663; G06F 17/2247
See application file for complete search history.

(56) References Cited

U.S. PATENT DOCUMENTS

| 8,250,464 B2 | 8/2012 | Dang et al. |
| 8,739,022 B2 | 5/2014 | Chiu et al. |

(Continued)

FOREIGN PATENT DOCUMENTS

CN 102495722 A 6/2012

OTHER PUBLICATIONS

Appendix P—List of IBM Patents or Patent Applications Treated as Related. 2 pages.

(Continued)

*Primary Examiner* — Usmaan Saeed
*Assistant Examiner* — Paul Kim
(74) *Attorney, Agent, or Firm* — David B. Woycehowsky (57) ABSTRACT

Parsing XML (extensible markup language) data by performing the following operations: (i) dividing the piece of markup language into a plurality of pre-parsing segments; (ii) assigning the pre-parsing segment to a pre-parsing processor thread of a plurality of pre-parsing processor threads; (iii) determining any parsing division point(s) occurring in the pre-parsing segment so that data corresponding to a single tabular record is between each consecutive pair of parsing division points; (iv) dividing the piece of language into a plurality of parsing segments defined by the parsing division points so that each parsing segment corresponds to a single tabular record; (v) assigning the parsing segment to a parsing processor thread of a plurality of parsing processor threads; and (vi) parsing to generate a parsed tabular record corresponding to the parsing segment.

4 Claims, 5 Drawing Sheets

(56) References Cited

U.S. PATENT DOCUMENTS

| | | | |
|---|---|---|---|
| 8,782,514 | B1 | 7/2014 | Chiu |
| 8,838,626 | B2 | 9/2014 | Yu et al. |
| 2009/0089658 | A1* | 4/2009 | Chiu .................. G06F 17/2247 715/234 |
| 2010/0174732 | A1 | 7/2010 | Levy et al. |
| 2011/0072319 | A1 | 3/2011 | Agarwal et al. |
| 2011/0153604 | A1 | 6/2011 | Yu et al. |
| 2014/0089332 | A1 | 3/2014 | Maharana et al. |
| 2014/0149851 | A1 | 5/2014 | Fang |

OTHER PUBLICATIONS

Chen et al., "ParaParse: A Parallel Method for XML Parsing", 2011 IEEE 3rd International Conference on Communication Software and Networks (ICCSN), Xi'an, May 27-29, 2011, pp. 81-85, doi: 10.1109/ICCSN.2011.6014223, 978-1-61284-485-5.

Li et al., "Parallel Parsing of Markup Language Data", U.S. Appl. No. 14/672,319, Filed Mar. 30, 2015.

Lu et al., "A Parallel Approach to XML Parsing", 7th IEEE/ACM International Conference on Grid Computing, Barcelona, pp. 223-230, doi: 10.1109/ICGRID.2006.311019.

Pan et al., "Parallel XML Parsing Using Meta-DFAs", Third IEEE International Conference on e-Science and Grid Computing, DOI 10.1109/e-Science.2007.16, pp. 237-244.

Varma et al., "Schema Based Parallel XML Parser: A Fast XML Parser Designed for Large XML Files", International Journal of Computer Science and Mobile Computing vol. 3 Issue 8, Aug. 2014, pp. 379-389.

"Large scale parallel parsing", IBM InfoSphere DataStage, Version 8.7.0, Release date: Oct. 1, 2011, <http://www-01.ibm.com/support/knowledgecenter/api/content/nl/en-us/SSZJPZ_8.7.0/com.ibm.swg.im.iis.ds.stages.xml.core.usage.doc/topics/largescaleparallelparsing.html>.

* cited by examiner

PARALLEL PARSING OF MARKUP LANGUAGE DATA

BACKGROUND OF THE INVENTION

The present invention relates generally to the field of markup language data (for example, XML (extensible markup language) data), and more particularly to parsing XML data.

XML is a type of computer language that typically defines rules for document encoding that is both machine (computer) readable and human readable. One typical strong point of the XML language is its usability and simplicity across many internet applications. XML's main design goal is focused around documents, but is also widely used for internet data structures.

XML becomes more and more widely used for saving information data in modern technology. In many applications, XML data is "parsed," which means that the XML data is against the formal rules of markup language grammar so that the meaning of the XML code is determined. Currently, most of the common parsing methods are typically single threaded, such as DOM (document object model), SAX (simple API (application programming interface) for XML), and software libraries. Some available parallel parsing solutions are created based on these methods. XML can typically utilize multiple CPU (central processing unit) core resources to accelerate the processing.

SUMMARY

According to an aspect of the present invention, there is a method, computer program product and/or system of processing a piece of markup language by machine logic that performs the following operations (not necessarily in the following order): (i) dividing the piece of markup language into a plurality of pre-parsing segments; (ii) for each pre-parsing segment, assigning the pre-parsing segment to a pre-parsing processor thread of a plurality of pre-parsing processor threads; (iii) for each pre-parsing segment, determining, by its assigned pre-parsing processor thread, any parsing division point(s) occurring in the pre-parsing segment so that data corresponding to a single tabular record is between each consecutive pair of parsing division points; (iv) responsive to the determination of the parsing division points, dividing the piece of language into a plurality of parsing segments defined by the parsing division points so that each parsing segment corresponds to a single tabular record; (v) for each parsing segment, assigning the parsing segment to a parsing processor thread of a plurality of parsing processor threads; and (vi) for each parsing segment, parsing, by its assigned parsing processor thread, to generate a parsed tabular record corresponding to the parsing segment.

DETAILED DESCRIPTION

Some embodiments of the present invention provide the capability to parallel pre-parse and parallel parse XML (extensible markup language) data. The XML data will be processed in parallel from read to parsing ensuring: (i) performance is scalable when the number of CPU (central processing unit) cores increases; (ii) significantly improves system resource utilization; and/or (iii) improves system performance. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
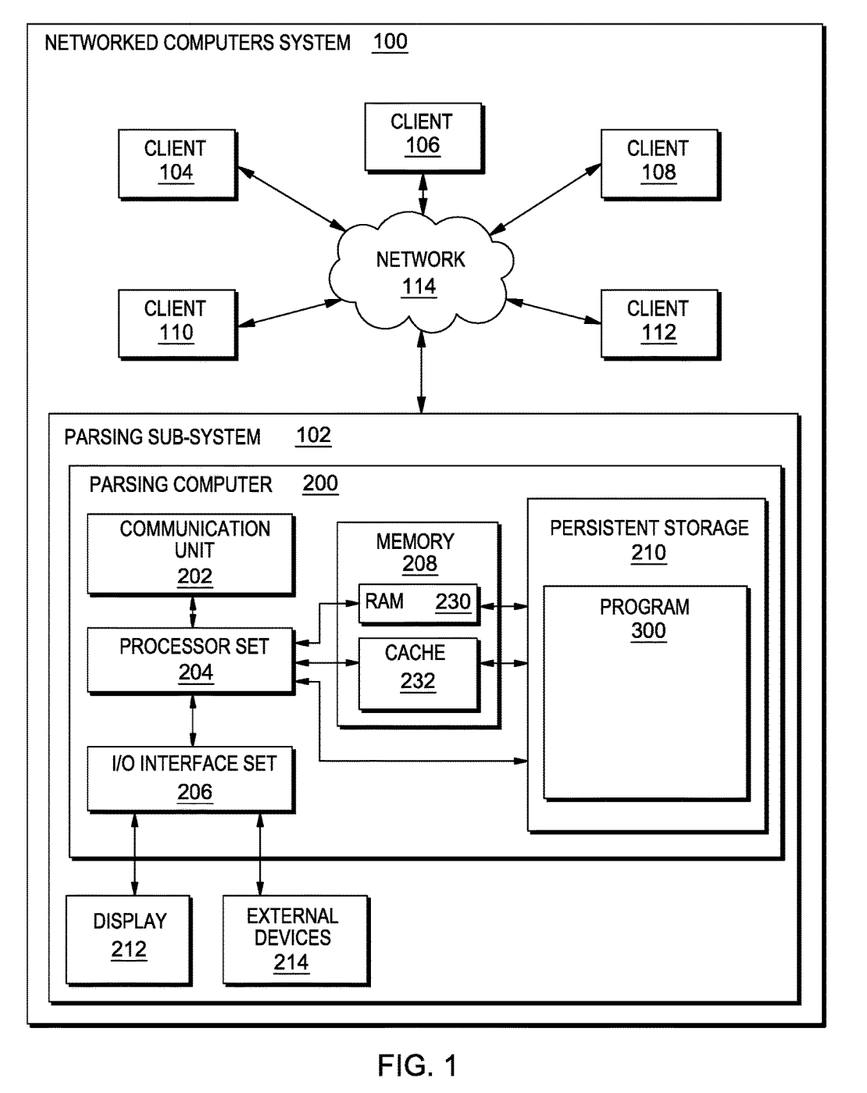
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: parsing sub-system 102; client sub-systems 104, 106, 108, 110, 112; communication network 114; parsing computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
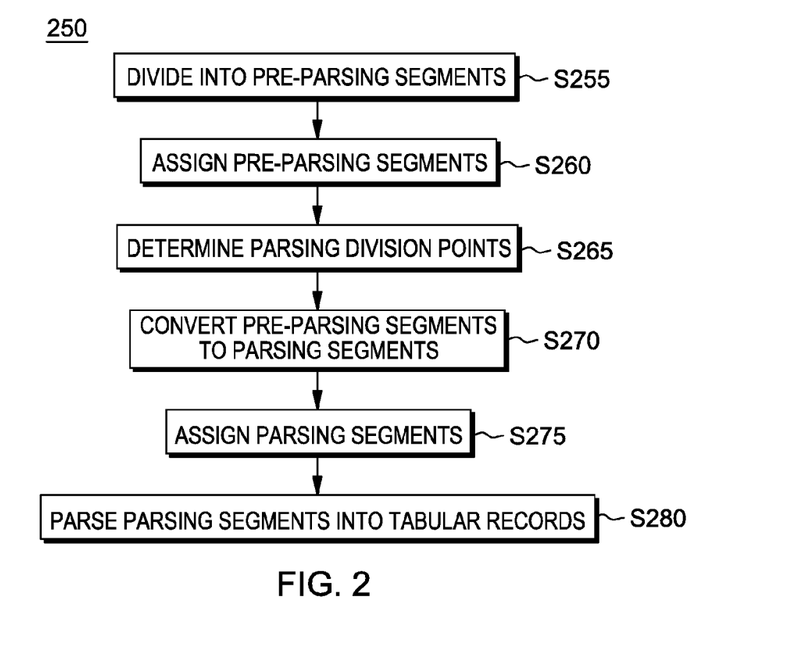
FIG. 2 is a flowchart showing a first embodiment method performed, at least in part, by the first embodiment system.
Figure 3:
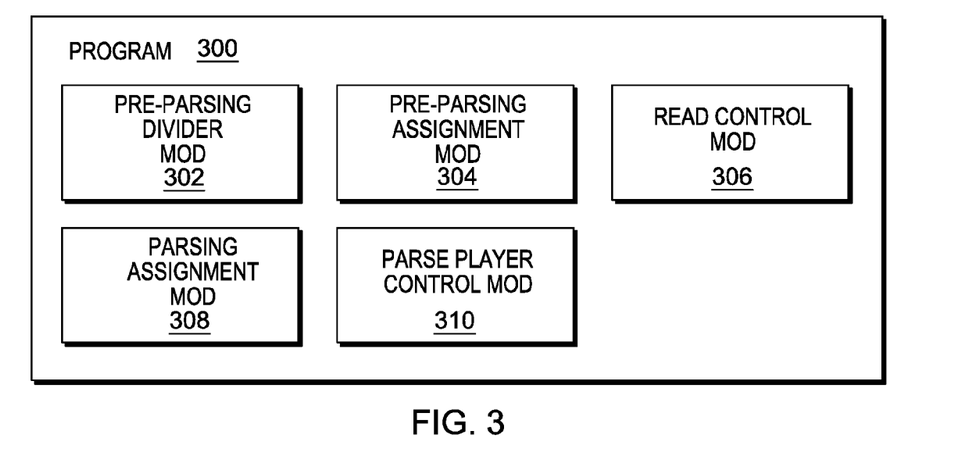
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where pre-parsing divider module ("mod") 302 divides a piece of data storage type markup language (not shown in the Figures) into pre-parsing segments where substantially all of the pre-parsing segments have the same number of lines (note that one of the pre-parsing segments may have a different number of lines when the total number of lines in the piece of markup language cannot be evenly divided into an integer number of pre-parsing segments). Alternatively, the pre-parsing segments could be divided based on some other easily determinable criteria, such as pre-parsing segments that substantially all have the same number of binary bits. Because the markup language is data storage type markup language (as contrasted with, for example, markup language used to generate an internet web site), it can be parsed into tabular records, and this is indeed a purpose of the method of flowchart 250. The markup language may come to parsing sub-system 102 from one of the client sub-systems 104, 106, 108, 110, 112 (see FIG. 1).

Processing proceeds to operation S260, where pre-parsing assignment mod 304 assigns the pre-parsing segments to a plurality of pre-parsing processor threads and respectively associated readers (these readers are not shown in FIGS. 1 to 3, but will be further discussed, below, in the Further Comments And/Or Embodiments sub-section of this Detailed Description section). In this way, the pre-parsing operation of subsequent steps can be performed in parallel for reasons of efficiency.

Processing proceeds to operation S265, where reader control mod 306 controls the operations of the readers so that the readers find any parsing division point(s) in each pre-parsing segment. An example of finding parsing division points will be set forth, below in connection with operation S270.

Processing proceeds to operation S270, where reader control mod 306 further controls the readers to convert the pre-parsing segments into parsing segments such that each parsing segment contains the markup language data for a single tabular record. The conversion is based on the parsing division points found previously at operation S265. The following code shows an example of this, where each complete pair of <Customer> . . . </Customer> in the markup language corresponds to a parsing segment, which, in turn corresponds to a to-be-parsed tabular record (with the parsing division points indicated by an "*" characters):

```
            <Customers>*
                <Customer>
                    <Name>John</Name>
                    <Height>102</Height>
                    <Age>34</Age>
                </Customer>*
                <Customer>
                    <Name>Lily</Name>
                    <Height>110</Height>
                    <Age>30</Age>
                </Customer>*
                ... *
            </Customers>
```

Processing proceeds to step S275, where parsing assignment mod 308 assigns each parsing segment to a respective parse player (not shown in FIGS. 1 to 3, but discussed, below, in the Further Comments And/Or Embodiments sub-section of this Detailed Description section) for parsing in parallel by parsing processor threads.

Processing proceeds to operation S280, where parse player control mod 310 controls the parallel parse processing threads and the parse players to parse each parsing segment into a tabular record. A table corresponding to the markup language code, set forth above, where each tabular record is presented as the row in the table is as follows:

| Name | Height | Age |
|------|--------|-----|
| John | 102    | 34  |
| Lily | 110    | 30  |
| ...  | ...    | ... |

III. Further Comments and/or Embodiments

Some embodiments of the present invention may include one, or more, of the following features, characteristics and/or advantages: (i) solves the problem of pre-parsing/splitting an XML (extensible markup language) file in parallel; (ii) the pre-parse phase is no longer the single thread; (iii) the pre-parse phase is no longer the bottleneck of the whole parsing process; (iv) provides scalability when the number of CPU (central processing unit) cores increase and exceed a certain number (which may take on increased importance as the computer industry moves towards using more CPU cores); (v) provides a new solution for handling markup language parsing steps in parallel; and/or (vi) effectively and/or efficiently balances system resources using multiple processing threads for performing markup language parsing.

Some embodiments of the present invention may include one, or more, of the following features, characteristics and/or advantages: (i) enhances the available parallel parsing technology; (ii) provides the capability to parallel pre-parse and parallel parse the XML data; (iii) XML data will be processed in parallel from read to parsing; (iv) ensures scalability when the number of CPU cores increases; (v) significantly improves system resource utilization; (vi) improves system performance; (vii) useful in the ETL (extract, transform, load) area; (viii) not limited to XML applications; and/or (ix) used in some parallel parsing fields.

In some embodiments of the present invention, the fundamental principle of the present invention can be described as follows: (i) obtain the key nodes by analyzing the schema file; (ii) pre-parse the XML file in parallel by dividing the whole XML file into n well-formed parts using a new method in DCM (distribution control module) in parallel; (iii) re-balance pre-parsing processes; (iv) re-balance parsing processes; and/or (v) parse each well-formed part in parallel.

Some embodiments of the present invention may include one, or more, of the following features, characteristics and/or advantages: (i) implement the XML file pre-parsing in parallel; and/or (ii) balance the system resource usage of multiple pre-parsing (reader) threads and parser threads.

Some embodiments of the present invention may include one, or more, of the following features, characteristics and/or advantages: (i) understanding the XML file structure by analyzing the schema file; (ii) dividing the whole XML file into n well-formed parts by the DCM (parallel); and/or (iii) parsing each well-formed part in parallel.

Figure 4:
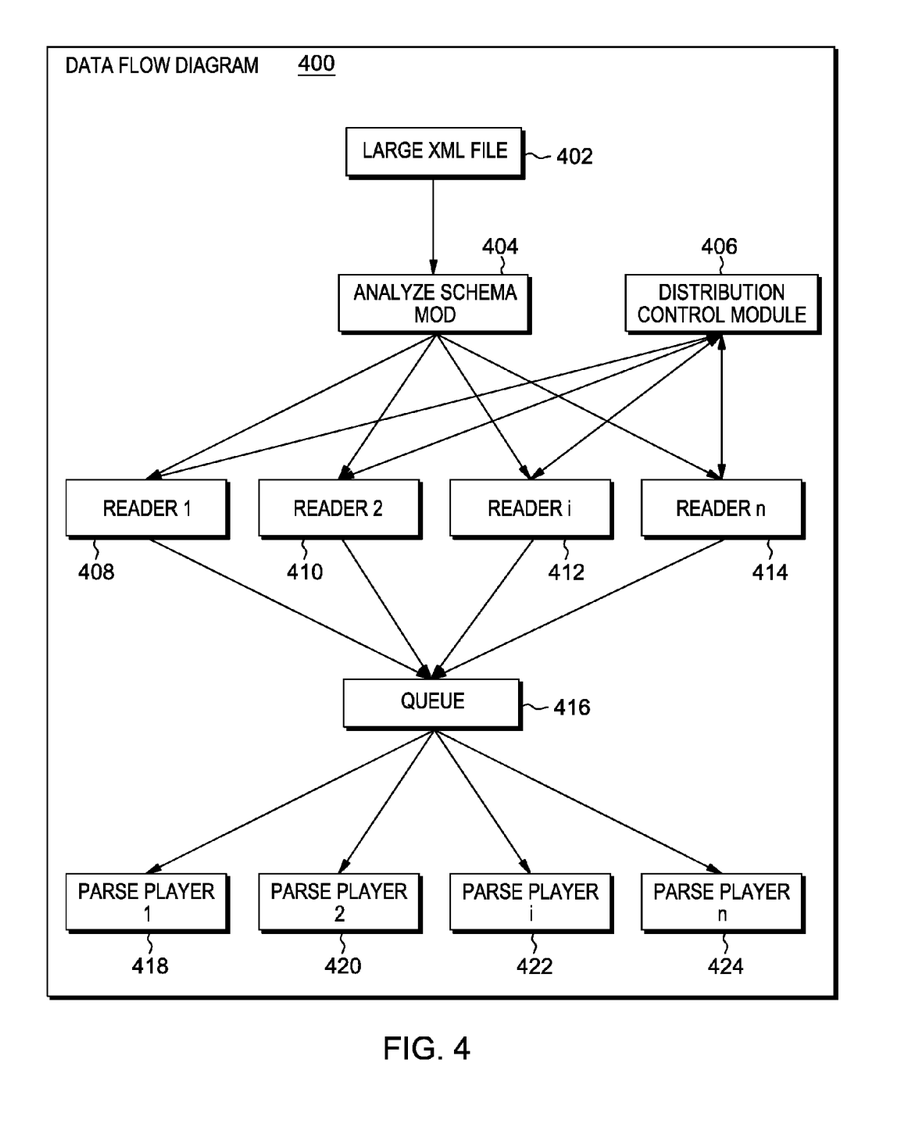
FIG. 4 is a block diagram of a second embodiment of a system according to the present invention.
Figure 5:
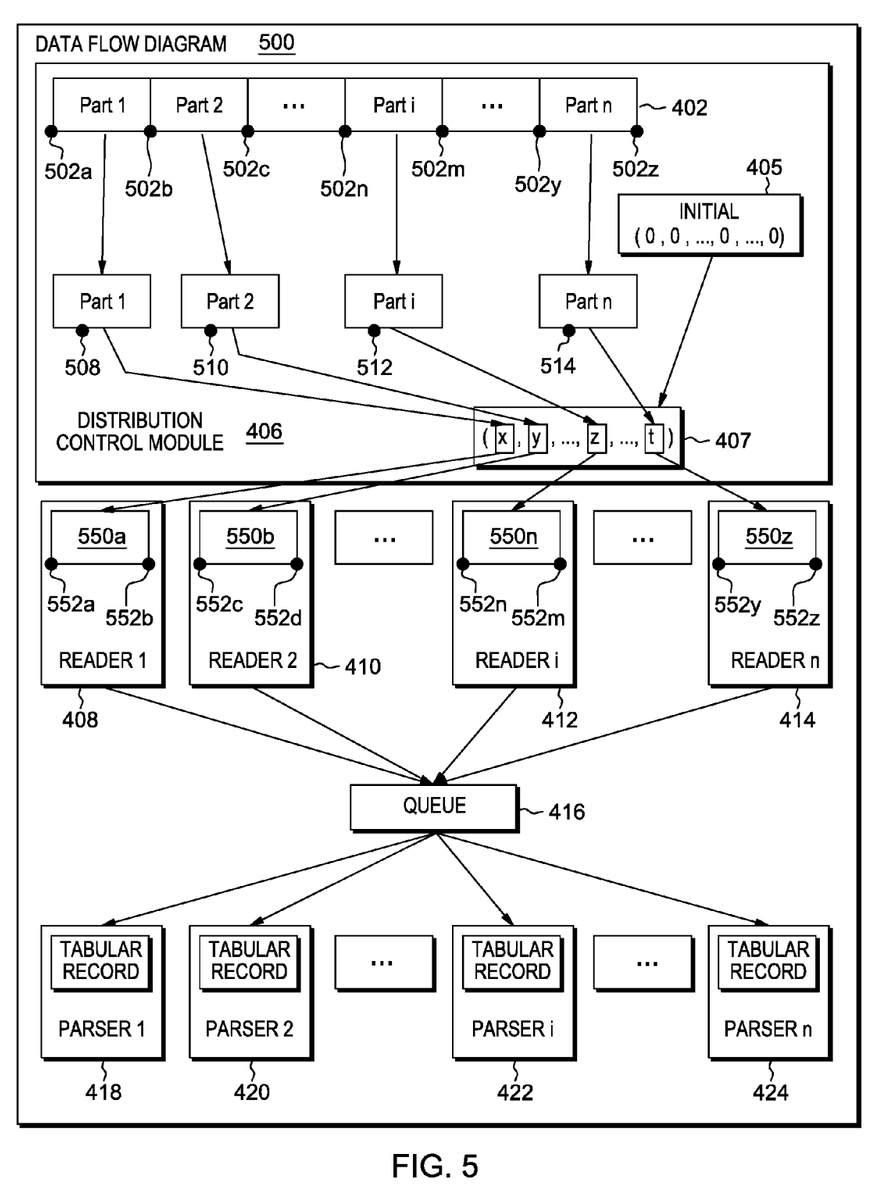
FIG. 5 is a data flow diagram showing data flow through the second embodiment system.

As shown in FIG. 4, diagram 400 shows the machine logic modules used to perform parsing according to an embodiment of the present invention. As shown in FIG. 5, diagram 500 shows the data flow as the data is parsed according to this embodiment of the present invention.

Figure 6:
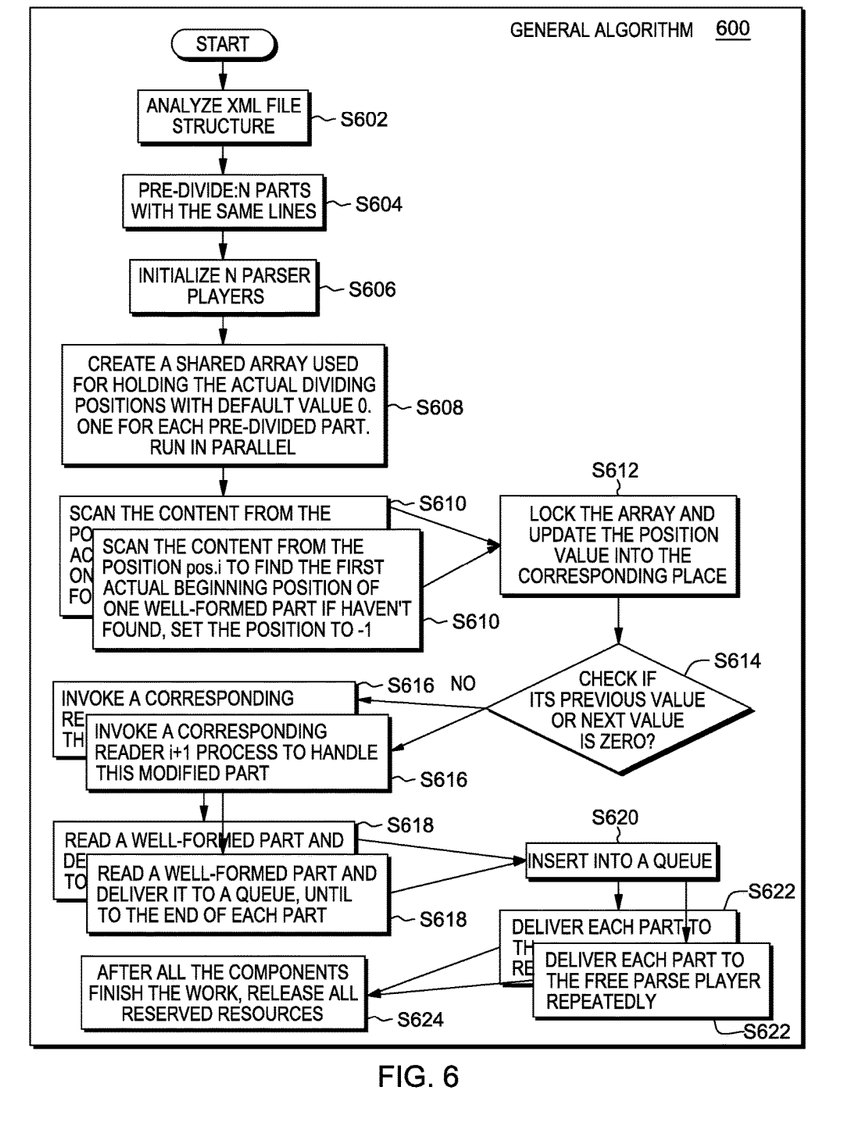
FIG. 6 is a flowchart of a second embodiment of a method according to the present invention.

As shown in FIG. 6, flowchart 600 shows the operations and process flow used to perform the parsing. In the following paragraphs, the operations of flowchart 600 will be discussed with extensive reference to FIGS. 4 and 5.

Processing begins at operation S602, where analyze schema module ("mod") 404 receives large XML file 402 for purposes of parsing it.

Processing proceeds to operation S604, where analyze schema mod 404 determines division points 502a . . . z used to divide large XML file 402 into pre-parsing segments 508, 510, 512, 514. Mod 404 determines these division points so substantially all of the pre-parsing segments will have an equal number of lines of XML code. These pre-parsing segments will not generally be amenable to being individually parsed because the constraint that they each have an equal number of lines will mean that the pre-parsing segments do not reflect meaningful segments with respect to the parsing process. In other words, a meaningful portion of XML code, with respect to parsing purposes, may require lines of code contained in more than one pre-parsing segment. However, the division into pre-parsing segments is generally fast and requires relatively little processing power because the rule that the XML code be broken into pre-parsing segments having an equal number of lines is a relatively simple rule to apply.

Processing proceeds to operation S606 where parser players 418, 420, 422, and 424 are initialized so that they are ready to receive and parse parsing segments (which parsing segments have not yet been defined at this point in the process).

Processing proceeds to operation S608 where distribution control mod 406 creates a shared array 407 for storing the pre-parsing segments. As shown schematically at block 405 of FIG. 5, the shared array is first initialized with zeroes. As shown schematically in FIG. 5, each position of the shared array respectively stores a pre-parsing segment. Because the pre-parsing segments are stored in the form of a shared array, any pre-parsing segment can be directly accessed at any given time, thereby allowing subsequent operation(s) to run in parallel. Further at step S608, distribution control mod 406 begins sending pre-parsing segments to readers 408, 410, 412, 414. In this embodiment, there are fewer readers than there are pre-parsing segments, so the operation of sending pre-parsing segments to readers will continue as subsequent operations of flowchart 600 are performed.

Processing continues to operations S610 to S618 where readers 408, 410, 412, 414, working in parallel, convert the pre-parsing segments into parsing segments (also sometimes referred to as "well-formed parts") 550a . . . z defined by parsing division points 552a . . . z, as shown in FIG. 5. These parsing segments are defined so that each parsing segment is individually independent and meaningful for parsing purposes.

Processing proceeds to operation S620 where the parsing segments are inserted into queue 416 as they are created.

Processing proceeds to operation S622 where each parsing segment in queue 416 is: (i) delivered to one of the parse players 418, 420, 422, 424; and (ii) parsed by the parse player to create a respectively corresponding tabular record. In this embodiment, the parsing of the parsing segments is similar to conventional XML processing. These tabular records can now be processed and/or stored by machine logic (for example, software) that is designed to handle tabular records. After a parse player parses a parsing segment, that parsing player: (i) is marked as "free;" and (ii) receives a new parsing segment from queue 416.

Processing proceeds to operation S624 where all reserved resources are released after all parsing segments have been parsed such that large XML file has been entirely parsed.

Some embodiments of the present invention may include one, or more, of the following features, characteristics and/or advantages: (i) resolves all complex issues while splitting the XML file in parallel; (ii) implements a pre-parsing parallel process (this eliminates the need to scan all equal-length parts in sequence to identify all the actual end positions for well-formed data chunks); (iii) makes an optimization on the data storage XML file; (iv) data chunks wouldn't cut off any complete data record; (v) very suitable for the XML parsing and subsequent data record stream process in ETL (extract, transform, load); (vi) doesn't need to build any type of DOM (document object model) tree; (vii) uses a shared array list and DCM module to implement the parallel pre-parsing process; (viii) implements parallel XML pre-parsing resulting in better performance; (ix) considers performance optimization while using multiple threads to pre-parse XML files; and/or (x) the method of parallel pre-parsing is more efficient.

Some embodiments of the present invention may include one, or more, of the following features, characteristics and/or advantages: (i) implements XML file pre-parsing in parallel using DCM; (ii) balances system resource usage of multiple pre-parsing reader threads and parser threads; and/or (iii) becomes a scheduler of multiple reads and parsers.

Some embodiments of the present invention may include one, or more, of the following features, characteristics and/or advantages: (i) parses a large XML data file that can be extracted to numbers of rows; (ii) in the ETL process, the extracted rows used directly (that is, without "landing") by downstream stages; and/or (iii) improves XML stage in ETL tools that use graphical notation to construct data integration solutions. Information technology and business development leads to fast growth of data size.

More and more customers use large data format XML file to store the data. As a result, the efficiency of parsing these XML files in ETL (extract-transform-load) can be important. Some embodiments of the present invention may include one, or more, of the following characteristics, features and/or advantages: (i) improve the performance of XML parsing process; (ii) use "Distribution Control Model" (DCM) to eliminate the single read bottleneck by enabling parallel pre-read capacity; (iii) use a customized "Queue" to achieve the load balance of multiple readers and multiple parsers; (iv) "catching" the row based label pair by pre-parsing the xml schema file; (v) dividing the whole XML file to "n" "well-formed" parts by using DCM to find the actual dividing positions in parallel; (vi) multiple readers are invoked to start reading the related content once the reader's begin and end positions are ready; (vii) each reader sends a data block to a queue once it reads the complete content data for one row; (viii) the queue detects the status of a set of parsers, and delivers the available data block to available parsers until all data blocks are delivered; (ix) DCM has following steps: (a) initialize a synchronized array to host the actual division positions, (b) split the XML file to n parts averagely, (c) find the first begin label of one row in each part, and (d) once a position is located, populate the position into the array, and then check the ready position pairs in the array, and invoke the ready readers; and/or (x) resolves performance bottleneck described above, with tiny cost of resources.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method (CIM) comprising: receiving an XML data file that includes a plurality of data record, which each data record including a start of record marker in XML format, a plurality of field values delimited in XML format, and an end of record marker in XML format;

dividing the XML data file into N un-pre-parsed portions, where N is greater than two and at least N-I of the N un-pre-parsed data portions have an equal number of lines of XML code;

for each given un-pre-parsed data portion of the N un-pre-parsed data portions, selecting a selected pre-parsing processor cores, from a plurality of processor core, to use to perform preparsing;

performing parallel pre-parsing on the N un-pre-parsed data portions, with each un-pre-parsed data portion being pre-parsed by its associated selected pre-parsing processor core, with the pre-parsing including determining the locations of the end of record marker(s) are located in each un-pre-parsed data potion, and with the pre-parsing being parallel in the sense that more than one data portion is pre-parsed simultaneously during at least some portions of the preparsing;

dividing the XML data file into M pre-parsed data portions, where M is equal to a number of records in the XML data file, based upon the determination of the locations of the end of record marker(s) in each of the un-pre-parsed data portions such that each pre-parsed data portion includes XML data corresponding to a single record;

for each given pre-parsed data portion of the M pre-parsed data portions, selecting a selected parsing processor core, from the plurality of processor cores, to use to perform parsing;

performing parallel parsing on the M pre-parsed data portions, with each pre-parsed data portion being parsed by its associated selected parsing processor core, with parsing including determining rows of a table respectively corresponding to records of the XML data file, and with the parsing being parallel in the sense that more than one pre-parsed data portion is parsed simultaneously during at least some portions of the parsing; and outputting a table data file including the parsed rows obtained by the parsing of the M pre-parsed data portions;

wherein the CIM improves the operation of a computer by allowing both a pre-parsing operation and a parsing operation to be performed in parallel by multiple cores of a processor having multiple cores to avoid a bottleneck when obtaining a table data file from an XML data file having multiple records and to ensure scalability when a number of CPU cores.

2. The CIM of claim 1 wherein each end of record marker in the XML file has the following syntax: </name-of-record> with name-of-record corresponding to a predetermined alphanumeric string.

3. The CIM of claim 2 wherein the alphanumeric string corresponding to the name-or-record being CUSTOMER.

4. The CIM of claim 1 wherein:

all of the N un-pre-parsed data portions except a last un-pre-parsed data portion of the N pre-parsed data portion has an equal number of lines of XML code; and the last un-pre-parsed data portion has fewer lines of code than the other un-pre-parsed data portions.

* * * * *